May 9, 1950    J. E. BROWN    2,506,854
TROLLING LEADER
Filed July 12, 1944
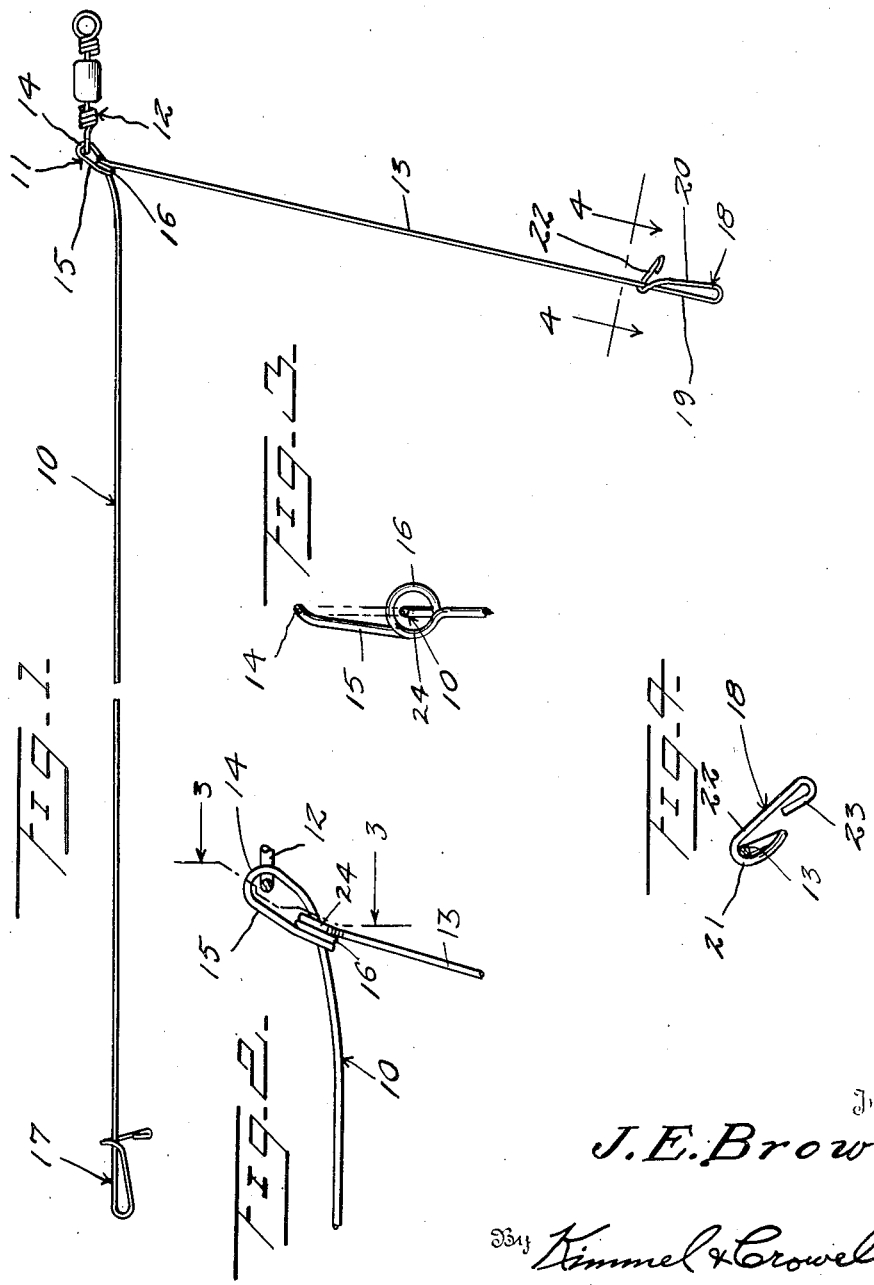
Inventor
J.E.Brown
By Kimmel & Crowell
Attorneys Patented May 9, 1950

2,506,854

UNITED STATES PATENT OFFICE 2,506,854

TROLLING LEADER

John E. Brown, Amherst, Ohio

Application July 12, 1944, Serial No. 544,501

1 Claim. (Cl. 43—28)

This invention relates to trolling leaders.

An object of this invention is to provide an improved trolling leader which is so constructed and arranged as to keep the sinker in proper relation to the leader or snell.

Another object of this invention is to provide an improved trolling leader which includes means whereby the wire will not break when the sinker is reeled in or pulled over the edge of a boat.

With the foregoing and other objects in view, the invention will be more fully described hereinafter, and will be more particularly pointed out in the claim appended hereto.

In the drawings wherein like symbols refer to like or corresponding parts throughout the several views, Figure 1 is a detailed side elevation partly broken away of a trolling leader constructed according to an embodiment of this invention.

Figure 2 is a fragmentary enlarged side elevation partly in section of the device.

Figure 3 is a sectional view, taken on the line 3—3 of Figure 2.

Figure 4 is a sectional view, taken on the line 4—4 of Figure 1.

Referring to the drawing, the numeral 10 designates generally an elongated leader member in the form of a wire of desired thickness and length. The wire 10 has connected to the forward end thereof a loop 11 with which a swivel 12 is adapted to be connected. A second wire 13 is formed integral with the loop 11 and extends angularly therefrom and is adapted to have a sinker mounted on the lower end thereof.

The loop 11 is formed by bending the forward end of the wire 10 into a loop 14 and then extending one side 15 of the loop rearwardly and bending the side 15 in the form of a pair of eyes 16 in coil form about the forward end of the wire 10. The eyes 16 form a guide for the forward end of the wire 10, and the upper end 24 of the sinker member 13 is formed integral with the convolutions forming the coil 16 and extends through the loop 11. With a construction of this kind, the wire 10 is freely slidable through the eye formed by the convolutions 16, so that pull on the swivel 12 will not tend to strain the eye or convolutions 16. The rear end of the wire 10 is formed with a split eye 17, and the lower end of the wire 13 is also formed with a similar split eye 18. The details of construction of these eyes will apply equally as well one to the other.

Referring to Figure 1, the eye 18 includes a side 19, formed as an extension of the wire 13, and a second reverted extension 20 which extends upwardly and is then bent laterally as indicated at 21, so as to form a hook with the bill 22 extending from the opposite side of the wire 13. The bill 22 constitutes a handle or lever, by means of which the eye 18 may be opened to permit insertion or removal of the sinker or other element mounted on the eye 18. The terminal end of the extension or handle 22 is formed as a reverted member 23 which will eliminate injury to the fingers when the eye 18 is opened.

The reverted portion 23 also facilitates the insertion of a line swivel eye or the like which may be connected with the eye 18.

In the use of this leader, the eye 17 is connected to the forward end of the trolling line, and the swivel 12 is adapted to have a snell or hook leader connected therewith. The eye 18 may have a sinker secured thereto, and when the line is being pulled through the water the leader will assume substantially the position shown in Figure 1 with the sinker leader 13 projecting downwardly.

The manner of forming the sinker leader 13 integral with the wire 10 provides a means whereby the swivel 12 will be substantially parallel with the wire 10 as the line is being pulled through the water, and any heavy strain on the swivel 12, as when a fish is caught, will tend to effect a pulling strain on the wire 10 rather than on the eye formed by the convolutions 16. In addition, by providing the wire 10 slidable through the eye formed by the convolutions 16, when the line is pulled over the edge of a boat, the eye will not tend to catch on the edge of the boat and thereby break or damage this eye as is the case with leaders heretofore in use.

What is claimed is:

A trolling leader comprising an elongated wire having a portion of its length substantially straight and a section at the end of that portion in the shape of a loop, another portion of that wire extending from that loop in coil form about the first portion and located partially within the loop, and a third portion extending from the coil in a direction away from the loop and the first portion, the said third portion having the end thereof adjacent the loop extending through the loop.

JOHN E. BROWN.

(References on following page)

REFERENCES CITED

The following references are of record in the file of this patent:

UNITED STATES PATENTS

| Number | Name | Date |
|---|---|---|
| 561,142 | Sterzing | June 2, 1896 |
| 700,208 | Lafo et al. | May 20, 1902 |
| 779,286 | Kramer | Jan. 3, 1905 |
| 1,720,287 | Moore | July 9, 1929 |
| 1,974,381 | Swanson et al. | Sept. 18, 1934 |
| 2,030,000 | Harrington | Feb. 4, 1936 |
| 2,050,757 | Leon | Aug. 11, 1936 |
| 2,173,750 | Braconi | Sept. 9, 1939 |
| 2,196,620 | Attarian | Apr. 9, 1940 |
| 2,234,588 | Cope | Mar. 11, 1941 |
| 2,315,295 | Stogermayr | Mar. 30, 1943 |
| 2,331,215 | Mincenberg | Oct. 5, 1943 |